(12) United States Patent
Kim et al.

(10) Patent No.: US 9,177,722 B2
(45) Date of Patent: Nov. 3, 2015

(54) MULTILAYER CERAMIC ELECTRONIC COMPONENT AND BOARD FOR MOUNTING THE SAME

(71) Applicant: SAMSUNG ELECTRO-MECHANICS CO., LTD., Suwon, Gyunggi-do (KR)

(72) Inventors: Jong Hoon Kim, Gyunggi-do (KR); Byung Soo Kim, Gyunggi-do (KR); Dae Bok Oh, Gyunggi-do (KR)

(73) Assignee: SAMSUNG ELECTRON-MECHANICS CO., LTD., Suwon-Si, Gyeonggi-Do (KR)

( * ) Notice: Subject to any disclaimer, the term of this patent is extended or adjusted under 35 U.S.C. 154(b) by 187 days.

(21) Appl. No.: 13/962,536

(22) Filed: Aug. 8, 2013

(65) Prior Publication Data
US 2014/0334062 A1 Nov. 13, 2014

(30) Foreign Application Priority Data

May 13, 2013 (KR) .................... 10-2013-0053547

(51) Int. Cl.
| | | |
|---|---|---|
| H01G 4/30 | (2006.01) | |
| H01G 4/12 | (2006.01) | |
| H01G 4/232 | (2006.01) | |

(52) U.S. Cl.
CPC ............. *H01G 4/12* (2013.01); *H01G 4/232* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 4,771,520 | A  * | 9/1988 | Tanaka et al. | ............ 29/25.42 |
| 2001/0043454 | A1* | 11/2001 | Yoshii et al. | ............ 361/321.2 |
| 2005/0047059 | A1* | 3/2005 | Togashi | ............ 361/306.3 |
| 2005/0088803 | A1 | 4/2005 | Umeda et al. | |
| 2010/0085682 | A1* | 4/2010 | Abe et al. | ............ 361/303 |
| 2012/0147516 | A1 | 6/2012 | Kim et al. | |
| 2012/0229950 | A1 | 9/2012 | Kim et al. | |
| 2012/0229951 | A1 | 9/2012 | Kim | |

FOREIGN PATENT DOCUMENTS

| | | |
|---|---|---|
| JP | 2005-129802 A | 5/2005 |
| JP | 2006-041268 A | 2/2006 |
| JP | 2012-124458 A | 6/2012 |
| JP | 2012-191163 A | 10/2012 |
| JP | 2012-191164 A | 10/2012 |

OTHER PUBLICATIONS

Japanese Office Action issued in corresponding Japanese Application No. 2013-163082 dated Feb. 3, 2015, with English Translation.

* cited by examiner

*Primary Examiner* — Dion R Ferguson
(74) *Attorney, Agent, or Firm* — McDermott Will & Emery LLP (57) ABSTRACT

There are provided a multilayer ceramic electronic component and a board for mounting the same. The multilayer ceramic electronic component includes: a hexahedral ceramic body including dielectric layers and satisfying T/W>1.0 when a width thereof is defined as W and a thickness thereof is defined as T; first and second internal electrodes stacked to face one another, with the dielectric layer interposed therebetween, within the ceramic body; and insulating layers formed on both lateral surfaces of the ceramic body and having a thickness less than that of the ceramic body, wherein when the sum of the width of the ceramic body and widths of the insulating layers is defined as Wb, $0.90 \leq W/Wb \leq 0.97$ is satisfied.

12 Claims, 6 Drawing Sheets

MULTILAYER CERAMIC ELECTRONIC COMPONENT AND BOARD FOR MOUNTING THE SAME

CROSS-REFERENCE TO RELATED APPLICATIONS

This application claims the priority of Korean Patent Application No. 10-2013-0053547 filed on May 13, 2013, in the Korean Intellectual Property Office, the disclosure of which is incorporated herein by reference.

BACKGROUND OF THE INVENTION

1. Field of the Invention

The present invention relates to a multilayer ceramic capacitor and a structure for mounting a multilayer ceramic capacitor on a circuit board.

2. Description of the Related Art

In accordance with the recent trend for the miniaturization of electronic products, the demand for a relatively small multilayer ceramic electronic component having a large capacitance has increased.

Therefore, efforts to stack thin dielectric layers and internal electrodes in greater amounts have been attempted using various methods, and recently, a multilayer ceramic electronic component in which the thickness of dielectric layers is reduced and the number of dielectric layers stacked therein is increased has been manufactured.

Accordingly, the multilayer ceramic electronic component is able to be miniaturized, due to the dielectric layers and the internal electrodes being thinned, allowing the number of stacked layers to be increased for the implementation of high capacitance.

As described above, the multilayer ceramic electronic component is able to be miniaturized and have an increased number of stacked layers, thereby implementing high capacitance. However, a thickness of the resultant multilayer ceramic electronic component may be greater than a width thereof, and when the multilayer ceramic electronic component is mounted on a board, it may frequently topple over, whereby a failure rate in mounting the multilayer ceramic electronic component has increased.

In addition, in the case in which a multilayer ceramic electronic component is manufactured to have a thickness greater than a width, a Tombstone defect, in which an electronic component is lifted upwardly and sloped when being mounted on a board, due to the surface tension of solder, i.e., a Manhattan phenomenon may occur.

Thus, research into improvements in reliability by preventing multilayer ceramic electronic components from toppling over when being mounted on a board and avoiding a Tombstone defect, while implementing high capacitance, remains required.

(Patent Document 1) Japanese Patent Laid-Open Publication No. 2005-129802

SUMMARY OF THE INVENTION

An aspect of the present invention provides a multilayer ceramic capacitor and a structure for mounting a multilayer ceramic capacitor on a circuit board.

According to an aspect of the present invention, there is provided a multilayer ceramic electronic component including: a hexahedral ceramic body including dielectric layers and satisfying T/W>1.0 when a width thereof is defined as W and a thickness thereof is defined as T; first and second internal electrodes stacked to face one another, with the dielectric layer interposed therebetween, within the ceramic body; and insulating layers formed on both lateral surfaces of the ceramic body and having a thickness less than that of the ceramic body, wherein when the sum of the width of the ceramic body and widths of the insulating layers is defined as Wb, $0.90 \leq W/Wb \leq 0.97$ is satisfied.

When the thickness of the insulating layer is defined as Ta, $0.05 \leq Ta/T \leq 0.97$ may be satisfied.

The dielectric layers may have an average thickness of 0.1 μm to 0.8 μm.

The first and second internal electrodes may have an average thickness of 0.6 μm or less.

The first and second internal electrodes may be stacked in a thickness direction of the ceramic body.

The first and second internal electrodes may be stacked in a width direction of the ceramic body.

According to another aspect of the present invention, there is provided a multilayer ceramic electronic component including: a hexahedral ceramic body including dielectric layers and satisfying T/W> 1.0 when a width thereof is defined as W and a thickness thereof is defined as T; first and second internal electrodes stacked to face one another, with the dielectric layer interposed therebetween, within the ceramic body; and insulating layers formed on both lateral surfaces of the ceramic body and having a thickness less than that of the ceramic body, wherein when a thickness of the insulating layer is defined as Ta, $0.05 \leq Ta/T \leq 0.97$ is satisfied.

The dielectric layers may have an average thickness of 0.1 μm to 0.8 μm.

The first and second internal electrodes may have an average thickness of 0.6 μm or less.

The first and second internal electrodes may be stacked in a thickness direction of the ceramic body.

The first and second internal electrodes may be stacked in a width direction of the ceramic body.

According to another aspect of the present invention, there is provided a board for mounting a multilayer ceramic electronic component, the board including: a printed circuit board having first and second electrode pads disposed thereon; and the multilayer ceramic electronic component as described above installed on the printed circuit board.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Multilayer Ceramic Capacitor (MLCC)

Hereinafter, embodiments of the invention will be described with reference to the accompanying drawings.

Figure 1:
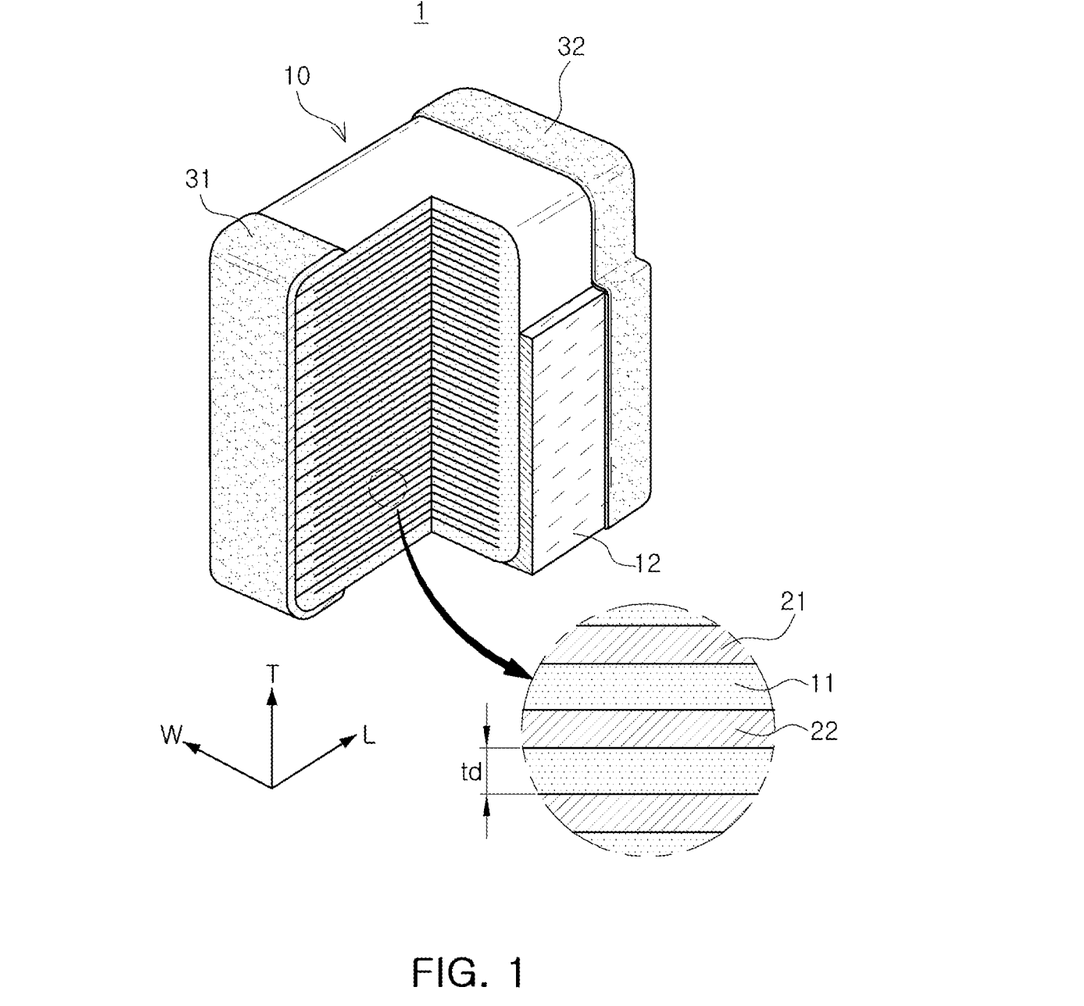
FIG. 1 is a partially cutaway perspective view schematically illustrating a multilayer ceramic capacitor (MLCC) according to an embodiment of the present invention.

FIG. 1 is a partially cutaway perspective view schematically illustrating a multilayer ceramic capacitor (MLCC) according to an embodiment of the invention.

Figure 2:
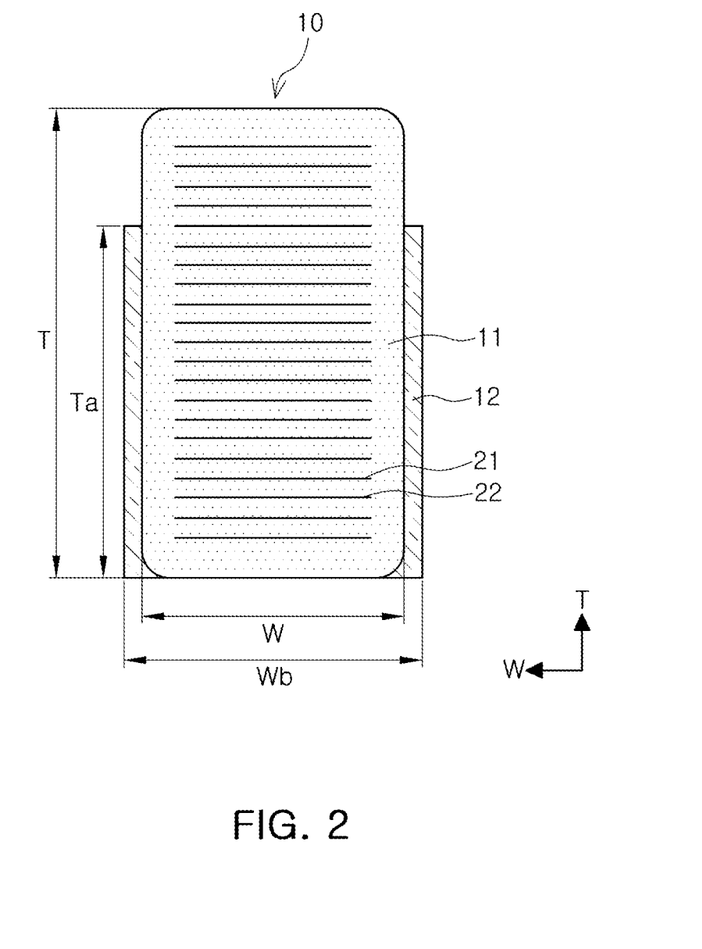
FIG. 2 is a cross-sectional view of the multilayer ceramic capacitor of FIG. 1 taken in a width direction.

FIG. 2 is a cross-sectional view of the multilayer ceramic capacitor of FIG. 1 taken in a width direction.

Referring to FIGS. 1 and 2, a multilayer ceramic electronic component according to an embodiment of the invention may include a hexahedral ceramic body 10 including dielectric layers 11 and satisfying $T/W \rangle 1.0$ when a width thereof is defined as W, and a thickness thereof is defined as T; and first and second internal electrodes 21 and 22 stacked to face one another, with the dielectric layer 11 interposed therebetween, within the ceramic body 10.

Hereinafter, a multilayer ceramic electronic component according to an embodiment of the invention will be described, and especially, a multilayer ceramic capacitor (MLCC) will be taken as an example of the multilayer ceramic electronic component; however, the invention is not limited thereto.

A shape of the ceramic body 10 is not particularly limited, and may be hexahedral, for example.

Meanwhile, in the multilayer ceramic capacitor according to the embodiment of the invention, a 'length direction' refers to an 'L' direction, a 'width direction' refers to a 'W' direction, and a 'thickness direction' refers to a 'T' direction. Here, the 'thickness direction' is the same as a direction in which dielectric layers are stacked, that is, a 'stacking direction.'

The multilayer ceramic capacitor 1 according to an embodiment of the invention may include the hexahedral ceramic body 10 including the dielectric layer 11 and satisfying T/W>1.0 when a width thereof is defined as W and a thickness thereof is defined as T; and the first and second internal electrodes 21 and 22 stacked to face one another, with the dielectric layer 11 interposed therebetween, within the ceramic body 10.

A material for forming the first and second internal electrodes 21 and 22 is not particularly limited. For example, the first and second internal electrodes 21 and 22 may be formed of a conductive paste made of at least one of noble metal materials such as palladium (Pd) and a palladium-silver (Pd—Ag) alloy, and the like, nickel (Ni) and copper (Cu).

The dielectric layer 11 may include a ceramic powder having high permittivity, for example, a barium titanate-based ($BaTiO_3$) powder or a strontium titanate-based ($SrTiO_3$) powder, but the invention is not limited thereto.

Meanwhile, the first and second internal electrodes 21 and 22, a pair of electrodes having opposite polarities, may be formed by printing a conductive paste including a conductive metal on the dielectric layers 11 to have a predetermined thickness.

An average thickness of the first and second internal electrodes 21 and 22 after sintering is not particularly limited as long as the internal electrodes may form capacitance. For example, the average thickness of the first and second internal electrodes may be 0.6 μm or less.

The average thickness of the first and second internal electrodes 21 and 22 may be measured on an image obtained by scanning a cross-section of the ceramic body 10 in a width direction using a scanning electron microscope (SEM), as shown in FIG. 2.

For example, as shown in FIG. 2, the average thickness of the internal electrode may be calculated by measuring thicknesses at thirty equidistant points in the width direction of any one of the internal electrodes extracted from the image obtained by scanning the cross-section of the ceramic body 10 in the width and thickness (W–T) direction cut in a central portion of the ceramic body 10 in the length direction, using the SEM.

The thicknesses at thirty equidistant points may be measured in a capacitance forming part, a region in which the first and second internal electrodes 21 and 22 are overlapped with each other.

In addition, in the case in which the average thickness measurement is performed with respect to 10 or more internal electrodes, the average thickness of the internal electrodes may be significantly generalized.

Further, the first and second internal electrodes 21 and 22 may be alternately exposed through both end surfaces of the ceramic body, and may be electrically insulated from each other by the dielectric layer 11 disposed therebetween.

That is, the first and second internal electrodes 21 and 22 may be electrically connected to the first and second external electrodes 31 and 32, respectively, through portions of the first and second internal electrodes 21 and 22 alternately exposed through the end surfaces of the ceramic body 10.

Therefore, in the case in which voltage is applied to the first and second external electrodes 31 and 32, electric charges are stored between the first and second internal electrodes 21 and 22 facing each other. Here, capacitance of the multilayer ceramic capacitor 1 is proportional to an area of an overlap region of the first and second internal electrodes 21 and 22.

In order to form capacitance, the first and second external electrodes 31 and 32 may be formed on the outer end surfaces of the ceramic body 10, and may be electrically connected to the first and second internal electrodes 21 and 22, respectively.

The first and second external electrodes 31 and 32 may be formed of the same conductive material as that of the internal electrodes, but the material for the first and second external electrodes 31 and 32 is not limited thereto. For example, the first and second external electrodes 31 and 32 may be formed of copper (Cu), silver (Ag), nickel (Ni), or the like.

The first and second external electrodes 31 and 32 may be formed by adding a glass frit to a metal powder to prepare a conductive paste, applying the prepared conductive paste to the outer surfaces of the ceramic body 10, followed by sintering thereof.

The ceramic body 10 may be formed by stacking the plurality of dielectric layers 11 and performing a sintering process. A shape and dimensions of the ceramic body and the number of stacked dielectric layers included therein are not limited to those shown in the present embodiment.

In addition, the plurality of dielectric layer 11 forming the ceramic body 10 are in a sintered state such that boundaries between adjacent dielectric layers may not be discernable without using the SEM.

According to the embodiment of the invention, an average thickness td of the dielectric layers 11 may be arbitrarily changed according to a capacity design of the multilayer ceramic capacitor 1, but the average thickness of the dielectric layer after sintering may be 0.1 to 0.6 μm.

The average thickness td of the dielectric layer 11 may be measured on the image obtained by scanning the cross-section of the ceramic body 10 in the width direction using the SEM, as shown in FIG. 2.

For example, as shown in FIG. 2, the average thickness of the dielectric layer may be calculated by measuring thicknesses at thirty equidistant points in the width direction of any one of the dielectric layers extracted from the image obtained by scanning the cross-section of the ceramic body 10 in the width and thickness (W-T) direction, cut in the central portion of the ceramic body 10 in the length direction, using the SEM.

The thicknesses at thirty equidistant points may be measured in a capacitance forming part, in which the first and second internal electrodes 21 and 22 are overlapped with each other.

In addition, in the case in which the average thickness measurement is performed with respect to 10 or more dielectric layers, the average thickness of the dielectric layers may be significantly generalized.

Meanwhile, when the width and the thickness of the ceramic body 10 are defined as W and T, respectively, T/W>1.0 may be satisfied.

The multilayer ceramic capacitor 1 according to the embodiment of the invention is formed to have an increased number of stacked layers therein for the realization of high capacitance, and the thickness T of the ceramic body 10 may be greater than the width W thereof.

General multilayer ceramic capacitors, on the other hand, have been manufactured such that a width thereof is almost the same as a thickness thereof.

However, a size of the multilayer ceramic capacitor according to the embodiment of the invention may be decreased, and sufficient space may be secured when being mounted on a board, and therefore, the number of stacked layers may be increased in order to realize a high capacitance multilayer ceramic capacitor.

Since the stacking direction of the dielectric layers in the ceramic body is a thickness direction, as the number of stacked layers is increased, a relationship of thickness T and width W of the ceramic body may satisfy T/W>1.0.

According to the embodiment of the invention, the multilayer ceramic capacitor is manufactured to satisfy T/W>1.0, so that large capacitance may be implemented therein.

Meanwhile, since the multilayer ceramic capacitor is manufactured to have the relationship between the thickness T and the width W of the ceramic body satisfying T/W>1.0, it may topple over when being mounted on a board, causing a short-circuit to degrade reliability.

Also, in the case in which the multilayer ceramic capacitor is manufactured such that the thickness thereof is greater than the width thereof, a Tombstone defect, in which the electronic component is lifted upwardly and sloped when being mounted on the board, due to the surface tension of solder, i.e., a Manhattan phenomenon, may occur.

However, according to the embodiment of the invention, the multilayer ceramic capacitor includes insulating layers 12 formed on both lateral surfaces of the ceramic body 10 and having thicknesses Ta less than the thickness T of the ceramic body 10, and when the sum of the width of the ceramic body 10 and widths of the insulating layers 12 is defined as Wb, $0.90 \le W/Wb \le 0.97$ may be satisfied, and thus, a short-circuit defect due to the toppling over of the multilayer ceramic capacitor when being mounted on the board, may be prevented.

Namely, since the multilayer ceramic capacitor 1 is manufactured as described above, even when the relationship between the thickness T and the width W of the ceramic body 10 satisfies T/W>1.0, the multilayer ceramic capacitor 1 may not topple over when being mounted on the board, thereby achieving excellent reliability.

In addition, a Tombstone defect, in which the electronic component is lifted upwardly and sloped when being mounted on the board, due to the surface tension of solder, i.e., a Manhattan phenomenon, may be prevented.

Thus, the multilayer ceramic capacitor may have excellent reliability.

If a ratio (W/Wb) of the width (W) of the ceramic body 10 to the sum (Wb) of the width of the ceramic body 10 and the widths of the insulating layers 12 is less than 0.90, a defect in terms of resistance to moisture may be generated, resulting in degrading reliability.

Meanwhile, if the ratio (W/Wb) of the width (W) of the ceramic body 10 to the sum (Wb) of the width of the ceramic body 10 and the widths of the insulating layers 12 exceeds 0.97, a mounting failure such as the toppling over of the multilayer ceramic capacitor or a Tombstone defect may occur when being mounted on the board.

According to the embodiment of the invention, when the thickness of the insulating layer 12 is defined as Ta, $0.05 \le Ta/T \le 0.97$ may be satisfied.

Namely, a ratio (Ta/T) of the thickness Ta of the insulating layer 12 to the thickness T of the ceramic body 10 is adjusted to satisfy $0.05 \le Ta/T \le 0.97$, whereby the effect of preventing a mounting failure due to the toppling over of the multilayer ceramic capacitor and a Tombstone defect when being mounted on the board can be enhanced.

If the ratio (Ta/T) of the thickness Ta of the insulating layer 12 to the thickness T of the ceramic body 10 is less than 0.05, when the multilayer ceramic capacitor 1 is mounted on the board, it may topple over or the warpage of the insulating layer 12 or cracks may occur, degrading reliability.

Meanwhile, if the ratio (Ta/T) of the thickness Ta of the insulating layer 12 to the thickness T of the ceramic body 10 exceeds 0.97, when the multilayer ceramic capacitor 1 is mounted on the board, it may topple over or a Tombstone defect may occur.

Meanwhile, a multilayer ceramic electronic component according to another embodiment of the invention may include a hexahedral ceramic body 10 including dielectric layers 11 and satisfying T/W>1.0 when a width thereof is defined as W, and a thickness thereof is defined as T; first and second internal electrodes 21 and 22 stacked to face one another, with the dielectric layer 11 interposed therebetween, within the ceramic body 10; and insulating layers 12 formed on both lateral surfaces of the ceramic body 10 and having a thickness less than that of the ceramic body 10, wherein when the thickness of the insulating layer 12 is defined as Ta, $0.05 \le Ta/T \le 0.97$ is satisfied.

The other features of the multilayer ceramic electronic component according to this embodiment of the invention are the same as those of the multilayer ceramic capacitor according to the above-described embodiment of the invention, and accordingly, a description thereof will be omitted.

Figure 3:
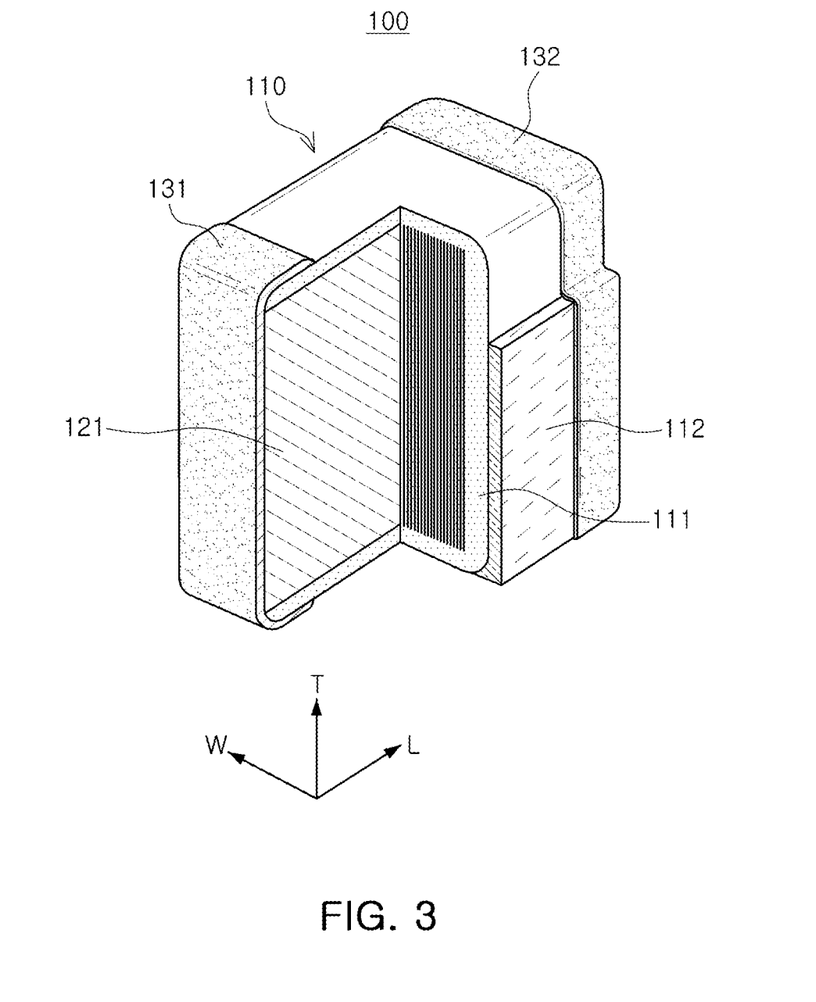
FIG. 3 is a partially cutaway perspective view schematically illustrating a multilayer ceramic capacitor according to another embodiment of the present invention.

FIG. 3 is a partially cutaway perspective view schematically illustrating a multilayer ceramic capacitor according to another embodiment of the invention.

Figure 4:
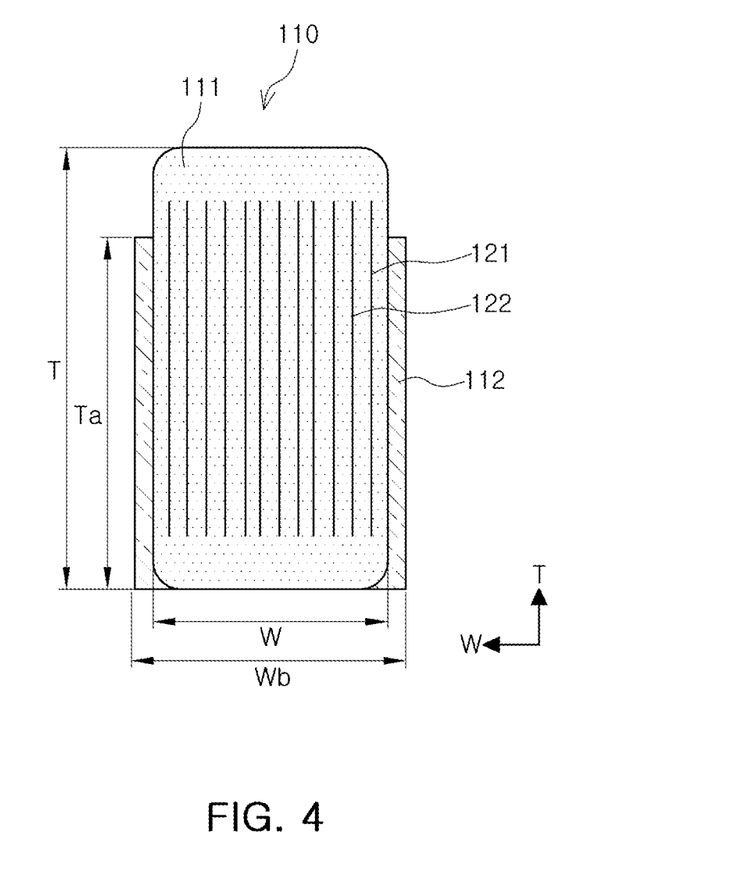
FIG. 4 is a cross-sectional view of the multilayer ceramic capacitor of FIG. 3 taken in a width direction.

FIG. 4 is a cross-sectional view of the multilayer ceramic capacitor of FIG. 3 taken in a width direction.

Referring to FIGS. 3 and 4, in a multilayer ceramic capacitor 100 according to this embodiment of the invention, a 'length direction' refers to an 'L' direction, a 'width direction' refers to a 'W' direction, and a 'thickness direction' refers to a 'T' direction. Here, the 'width direction' is the same as a direction in which dielectric layers are stacked, that is, a 'stacking direction.'

Namely, as illustrated in FIGS. 3 and 4, unlike the multilayer ceramic capacitor according to the above-described embodiment of the invention, the multilayer ceramic capacitor 100 according to this embodiment of the invention has a ceramic body 110 in which a plurality of dielectric layers 111 are stacked in a width direction.

The multilayer ceramic capacitor 100 according to the embodiment of the invention may have a vertical mounting configuration in which internal electrodes are disposed to be perpendicular to a board when being mounted on the board.

The multilayer ceramic capacitor 100 according to the embodiment of the invention may include a hexahedral ceramic body 110 including dielectric layers 111 and satisfying $T/W>1.0$ when a width thereof is defined as W, and a thickness thereof is defined as T; first and second internal electrodes 121 and 122 stacked to face one another, with the dielectric layer 111 interposed therebetween, within the ceramic body 110; and insulating layers 112 formed on both lateral surfaces of the ceramic body 110 and having a thickness less than that of the ceramic body 110, wherein when the sum of the width of the ceramic body 110 and widths of the insulating layers 112 is defined as Wb, $0.90 \leq W/Wb \leq 0.97$ is satisfied.

According to the embodiment of the invention, in addition to the foregoing features, when the thickness of the insulating layer 112 is defined as Ta, $0.05 \leq Ta/T \leq 0.97$ may be satisfied.

Meanwhile, a multilayer ceramic capacitor 100 according to another embodiment of the invention may include a hexahedral ceramic body 110 including dielectric layers 111 and satisfying $T/W>1.0$ when a width thereof is defined as W, and a thickness thereof is defined as T; first and second internal electrodes 121 and 122 stacked to face one another, with the dielectric layer 111 interposed therebetween, within the ceramic body 110; and insulating layers 112 formed on both lateral surfaces of the ceramic body 110 and having a thickness less than that of the ceramic body 110, wherein when the thickness of the insulating layer 112 is defined as Ta, $0.05 \leq Ta/T \leq 0.97$ is satisfied.

The other features of the multilayer ceramic capacitor according to this embodiment of the present invention are the same as those of the multilayer ceramic capacitor according to the above-described embodiment of the invention, and accordingly, a description thereof will be omitted.

Hereinafter, the invention will be described in detail with reference to Inventive and Comparative Examples, but is not limited thereto.

These Examples were carried out with respect to multilayer ceramic capacitors including dielectric layers having an average thickness of 0.6 μm or less, in order to test the occurrence of moisture resistance defects and a frequency of mounting failures when being mounted on a board, according to a ratio (W/Wb) of a width (W) of a ceramic body to the sum (Wb) of the width of the ceramic body and widths of insulating layers and a ratio (Ta/T) of a thickness Ta of the insulating layer to a thickness T of the ceramic body.

The multilayer ceramic capacitors according to the Inventive Examples were manufactured as follows.

First, slurry containing a powder such as a barium titanate ($BaTiO_3$) powder having an average particle size of 0.1 μm was applied to a carrier film and dried, such that a plurality of ceramic green sheets having thicknesses of 1.05 μm and 0.95 μm, respectively, were prepared to form the dielectric layers 11.

Next, a conductive paste for internal electrodes containing 40 to 50 parts by weight of a nickel powder having an average particle size of 0.1 μm to 0.2 μm was prepared.

The conductive paste for internal electrodes was applied to the green sheets using a screen printing method to thereby form the internal electrodes, and 500 or more sheets were then stacked to form a multilayer body.

Thereafter, the multilayer body was compressed and cut to form 0603 (length×width)-sized chips, each having a ratio between thickness and width exceeding 1.0 (T/W>1.0), and the chips were sintered under a reducing atmosphere of $H_2$ 0.1% or less at a temperature ranging from 1,050° C. to 1,200° C.

Then, processes such as an external electrode formation process, a plating layer formation process, and the like, were performed to manufacture the multilayer ceramic capacitor.

The multilayer ceramic capacitors according to the Comparative Examples were manufactured in the same manner as the method of the Inventive Examples, except that the ratio (W/Wb) of the width W of the ceramic body to the sum Wb of the width of the ceramic body and the widths of the insulating layers and the ratio (Ta/T) of the thickness Ta of the insulating layer to the thickness T of the ceramic body were different from the numerical ranges defined in the Inventive Examples.

The following Table 1 shows comparison results in terms of moisture resistance defects and the frequency of toppling over of the multilayer ceramic capacitors when being mounted on the board, according to the ratio (W/Wb) of the width W of the ceramic body to the sum Wb of the width of the ceramic body and the widths of the insulating layers.

In this case, the test was performed in a state in which the ratio (Ta/T) of the thickness Ta of the insulating layer to the thickness T of the ceramic body was fixed to 0.3 (30%).

The evaluation of the moisture resistance defects was performed on two hundred chips after the chips were mounted on the board, under the conditions of 8585 testing (temperature: 85 and humidity: 85%), and satisfactory samples were indicated as "○" and defective samples were indicated as "x."

The evaluation of the frequency of the toppling over of samples when mounted on a board was performed by representing the number of toppled samples among a million samples by ppm, and here, cases less than or equal to 20 ppm were determined to be satisfactory and cases exceeding 20 ppm were determined to be defective.

TABLE 1

| Sample No. | W/Wb | Moisture Resistance Defects | Frequency of Toppling-Over at the time of mounting |
|---|---|---|---|
| *1 | 0.86 | x | 0 |
| *2 | 0.88 | x | 0 |
| 3 | 0.90 | ○ | 0 |
| 4 | 0.92 | ○ | 0 |
| 5 | 0.94 | ○ | 0 |
| 6 | 0.95 | ○ | 8 |

TABLE 1-continued

| Sample No. | W/Wb | Moisture Resistance Defects | Frequency of Toppling-Over at the time of mounting |
|---|---|---|---|
| 7 | 0.96 | ○ | 11 |
| 8 | 0.97 | ○ | 15 |
| *9 | 0.98 | ○ | 321 |
| *10 | 0.99 | ○ | 664 |

*Comparative Examples

Referring to Table 1, it can be seen that, in samples 1 and 2 (comparative examples) in which the ratio (W/Wb) of the width W of the ceramic body to the sum (Wb) of the width of the ceramic body and the widths of the insulating layers was less than 0.90, they had moisture resistance defects, resulting in degradation of reliability.

Also, it can be seen that, in samples 9 and 10 (comparative examples) in which the ratio (W/Wb) of the width W of the ceramic body to the sum (Wb) of the width of the ceramic body and the widths of the insulating layers exceeded 0.97, they toppled over when mounted on the board, resulting in degradation of reliability.

On the other hand, it can be seen that, in samples 3 to 8 (inventive examples) satisfying the numerical ranges of the inventive concept, they had good moisture resistance characteristics and did not topple over when mounted on the board, thereby realizing high capacity multilayer ceramic capacitors having excellent reliability.

The following Table 1 shows comparison results in terms of moisture resistance defects, the warpage of insulating layers, the generation of cracks, and the frequency of toppling over of the multilayer ceramic capacitors when being mounted on the board, according to ratio (Ta/T) of the thickness Ta of the insulating layer to the thickness T of the ceramic body.

In this case, the test was performed in a state in which the ratio (W/Wb) of the width W of the ceramic body to the sum Wb of the width of the ceramic body and the widths of the insulating layers was fixed to 0.97 (97%).

The evaluation of the moisture resistance defects was performed on two hundred chips after the chips were mounted on the board, under the conditions of 8585 testing (temperature: 85 and humidity: 85%), and satisfactory samples were indicated as "○" and defective samples were indicated as "x."

The warpage of the insulating layers and the generation of cracks were evaluated to determine reliability. A case in which the insulating layers were not warped and cracks were not generated was indicated as "○", and a case in which the insulating layers were warped and cracks were generated was indicated as "x".

The evaluation of the frequency of toppling over of samples when mounted on the board was performed by representing the number of toppled samples among a million samples by ppm, and here, cases less than or equal to 20 ppm were determined to be satisfactory and cases exceeding 20 ppm were determined to be defective.

TABLE 2

| Sample No. | Ta/T | Moisture Resistance Defects | Warpage or Cracks of Insulating Layer | Frequency of Toppling-Over at the time of mounting |
|---|---|---|---|---|
| *11 | 0.99 | ○ | ○ | 92 |
| 12 | 0.97 | ○ | ○ | 9 |
| 13 | 0.95 | ○ | ○ | 2 |
| 14 | 0.50 | ○ | ○ | 2 |
| 15 | 0.30 | ○ | ○ | 0 |
| 16 | 0.10 | ○ | ○ | 0 |
| 17 | 0.05 | ○ | ○ | 4 |
| *18 | 0.02 | ○ | x | 134 |

*Comparative Examples

Referring to Table 2, it can be seen that, in sample (comparative example) in which the ratio (Ta/T) of the thickness Ta of the insulating layer to the thickness T of the ceramic body exceeded 0.97, it toppled over when mounted on the board, resulting in degradation of reliability.

Also, it can be seen that, in sample 18 (comparative example) in which the ratio (Ta/T) of the thickness Ta of the insulating layer to the thickness T of the ceramic body was less than 0.05, it toppled over when the mounted on the board, and the insulating layer was warped and had cracks generated therein, resulting in degradation of reliability.

On the other hand, it can be seen that, in samples 12 to 17 (inventive examples) satisfying the numerical ranges of the inventive concept, they had good moisture resistance characteristics and did not topple over when mounted on the board, thereby realizing high capacity multilayer ceramic capacitors having excellent reliability.

Board for Mounting Multilayer Ceramic Capacitor

Figure 5:
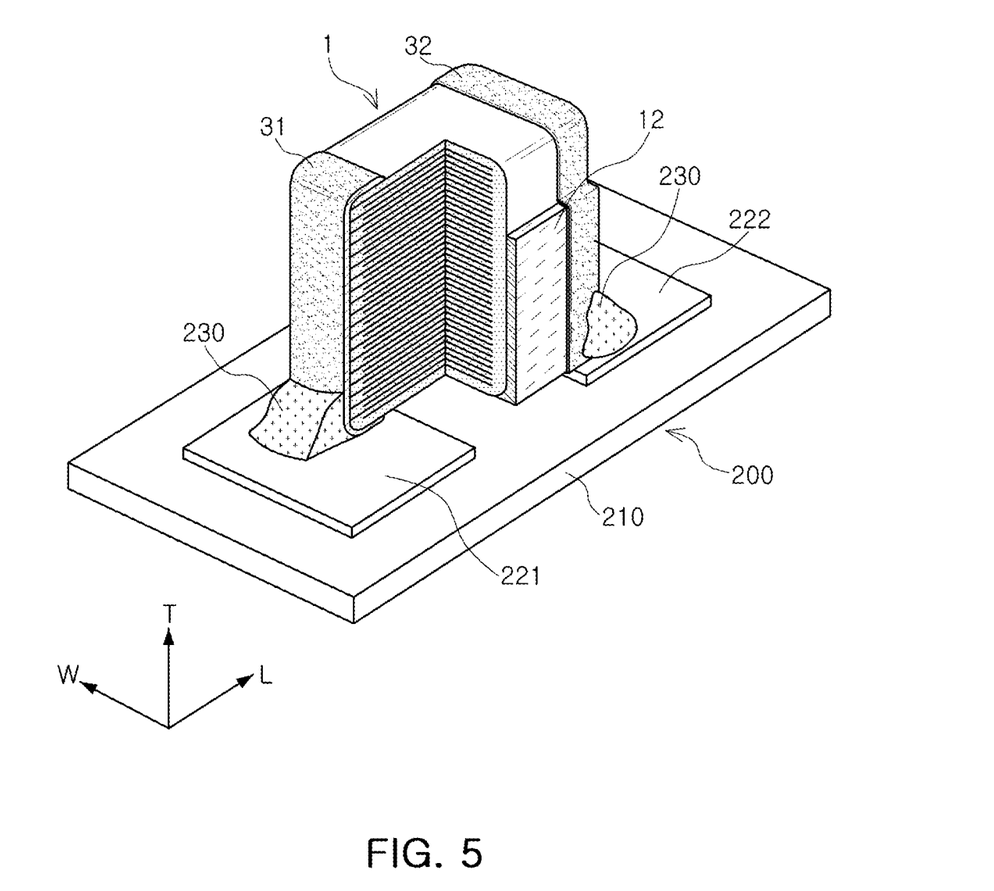
FIG. 5 is a perspective view illustrating the multilayer ceramic capacitor of FIG. 1 mounted on a printed circuit board.

FIG. 5 is a perspective view illustrating the multilayer ceramic capacitor of FIG. 1 mounted on a printed circuit board (PCB).

Figure 6:
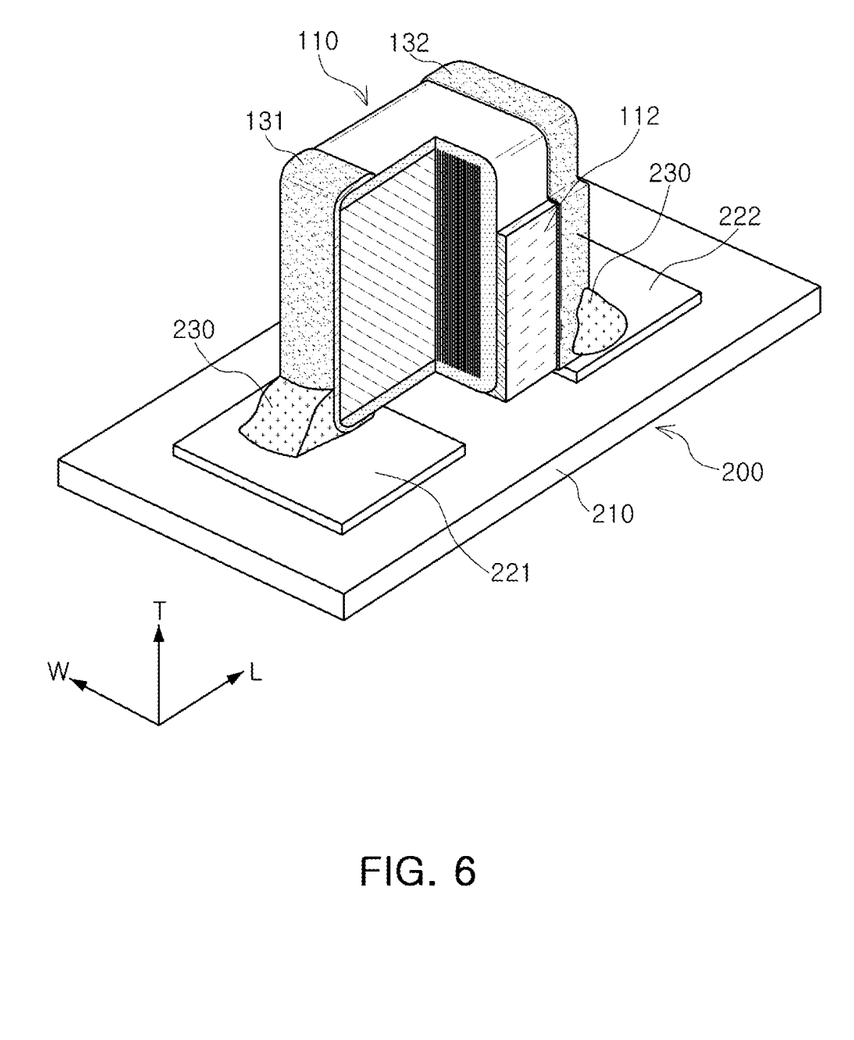
FIG. 6 is a perspective view illustrating the multilayer ceramic capacitor of FIG. 3 mounted on a printed circuit board.

FIG. 6 is a perspective view illustrating the multilayer ceramic capacitor of FIG. 3 mounted on a printed circuit board (PCB).

Referring to FIG. 5, a board 200 for mounting the multilayer ceramic capacitor 1 according to an embodiment of the invention may include a printed circuit board 210 on which the multilayer ceramic capacitor 1 is mounted horizontally, and first and second electrode pads 221 and 222 formed on the printed circuit board 210 so as to be spaced apart from each other.

Here, the multilayer ceramic capacitor 1 may be electrically connected to the printed circuit board 210 by a solder 230 in a state in which the first and second external electrodes 31 and 32 are positioned to contact the first and second electrode pads 221 and 222, respectively.

Also, referring to FIG. 6, a board 200 for mounting the multilayer ceramic capacitor 100 according to another embodiment of the invention may include a printed circuit board 210 on which the multilayer ceramic capacitor 100 is mounted vertically, and first and second electrode pads 221 and 222 formed on the printed circuit board 210 so as to be spaced apart from each other.

The board for mounting a multilayer ceramic electronic component according to the embodiment of the present invention may have a multilayer ceramic electronic component mounted thereon, the multilayer ceramic electronic component including a hexahedral ceramic body including dielectric layers and satisfying T/W>1.0 when a width thereof is defined as W, and a thickness thereof is defined as T, and having high capacitance implemented therein.

Also, in the board for mounting a multilayer ceramic electronic component according to another embodiment, even in the case that the multilayer ceramic capacitor is mounted on the board horizontally or vertically, the ratio (W/Wb) of the width W of the ceramic body to the sum Wb of the width of the ceramic body and the widths of the insulating layers satisfies $0.90 \leq W/Wb \leq 0.97$ as mentioned above, and thus, the multilayer ceramic electronic component does not topple over.

In addition, since the ratio (Ta/T) of the thickness Ta of the insulating layer to the thickness T of the ceramic body satisfies $0.05 \leq Ta/T \leq 0.97$, the multilayer ceramic electronic component does not topple over when being mounted on the board.

Therefore, the board including the multilayer ceramic capacitor having high capacitance and excellent reliability may be obtained.

As set forth above, according to embodiments of the invention, a large capacitance multilayer ceramic electronic component having excellent reliability can be provided.

In addition, when the large capacity multilayer ceramic electronic component is mounted on a board, it is prevented from toppling over and a Tombstone defect can be prevented.

Therefore, the high capacity multilayer ceramic electronic component having excellent reliability can be provided.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
   a hexahedral ceramic body including dielectric layers and satisfying T/W>1.0 when a width thereof is defined as W and a thickness thereof is defined as T;
   first and second internal electrodes stacked to face one another, with the dielectric layer interposed therebetween, within the ceramic body; and
   insulating layers formed on both lateral surfaces of the ceramic body and having a thickness less than that of the ceramic body,
   wherein, when the sum of the width of the ceramic body and widths of the insulating layers is defined as Wb, $0.90 \leq W/Wb \leq 0.97$ is satisfied.

2. The multilayer ceramic electronic component of claim 1, wherein, when the thickness of the insulating layer is defined as Ta, $0.05 \leq Ta/T \leq 0.97$ is satisfied.

3. The multilayer ceramic electronic component of claim 1, wherein the dielectric layers have an average thickness of 0.1 μm to 0.8 μm.

4. The multilayer ceramic electronic component of claim 1, wherein the first and second internal electrodes have an average thickness of 0.6 μm or less.

5. The multilayer ceramic electronic component of claim 1, wherein the first and second internal electrodes are stacked in a thickness direction of the ceramic body.

6. The multilayer ceramic electronic component of claim 1, wherein the first and second internal electrodes are stacked in a width direction of the ceramic body.

7. A multilayer ceramic electronic component comprising:
   a hexahedral ceramic body including dielectric layers and satisfying T/W>1.0 when a width thereof is defined as W and a thickness thereof is defined as T;
   first and second internal electrodes stacked to face one another, with the dielectric layer interposed therebetween, within the ceramic body; and
   insulating layers formed on both lateral surfaces of the ceramic body and having a thickness less than that of the ceramic body,
   wherein, when a thickness of the insulating layer is defined as Ta, $0.05 \leq Ta/T \leq 0.97$ is satisfied.

8. The multilayer ceramic electronic component of claim 7, wherein the dielectric layers have an average thickness of 0.1 μm to 0.8 μm.

9. The multilayer ceramic electronic component of claim 7, wherein the first and second internal electrodes have an average thickness of 0.6 μm or less.

10. The multilayer ceramic electronic component of claim 7, wherein the first and second internal electrodes are stacked in a thickness direction of the ceramic body.

11. The multilayer ceramic electronic component of claim 7, wherein the first and second internal electrodes are stacked in a width direction of the ceramic body.

12. A board for mounting a multilayer ceramic electronic component, the board comprising:
    a printed circuit board having first and second electrode pads disposed thereon; and
    the multilayer ceramic electronic component of claim 1 installed on the printed circuit board.

* * * * *